(12) United States Patent
Kunt et al.

(10) Patent No.: US 6,394,722 B1
(45) Date of Patent: May 28, 2002

(54) ANTI-DISTORTION INSERT FOR MOUNTING OPTICAL ELEMENTS ON A HONEYCOMB PANEL

(75) Inventors: Cengiz Kunt; Chiachung Lee, both of Beltsville, MD (US)

(73) Assignee: Swales Aerospace, Beltsville, MD (US)

( * ) Notice: Subject to any disclaimer, the term of this patent is extended or adjusted under 35 U.S.C. 154(b) by 0 days.

(21) Appl. No.: 09/427,390

(22) Filed: Oct. 26, 1999

(51) Int. Cl.[7] ................................ F16B 37/04
(52) U.S. Cl. ................ 411/82; 411/172; 52/708; 52/787.1
(58) Field of Search .............. 411/82, 82.1, 82.5, 411/172, 427, 432, 433, 930, 338, 339, 331, 551, 389; 403/28, 29, 30; 52/705, 708, 787.1

(56) References Cited

U.S. PATENT DOCUMENTS

| | | | |
|---|---|---|---|
| 1,045,562 A | * 11/1912 | Kennedy | 411/82 |
| 1,447,515 A | * 3/1923 | Miller | |
| 2,403,541 A | * 7/1946 | Molat | 411/82 |
| 3,313,078 A | * 4/1967 | Rohe | 52/708 |
| 3,316,953 A | * 5/1967 | Fransson | |
| 3,342,096 A | * 9/1967 | Bobrowski | |
| 3,563,131 A | * 2/1971 | Ridley | |
| 4,191,486 A | 3/1980 | Pelton | |
| 4,399,642 A | * 8/1983 | Bard | |
| 4,597,153 A | 7/1986 | Zaydel | |
| 4,650,385 A | * 3/1987 | Jackson | |
| 4,981,735 A | * 1/1991 | Rickson | 52/787.1 |
| 5,066,180 A | * 11/1991 | Lang | |
| 5,098,765 A | 3/1992 | Bien | |
| 5,118,236 A | * 6/1992 | Rodriguez | |
| 5,314,280 A | 5/1994 | Gagliardi et al. | |

FOREIGN PATENT DOCUMENTS

| | | | | |
|---|---|---|---|---|
| GB | 2098695 | * 11/1982 | | 411/427 |
| IT | 443054 | * 1/1950 | | 411/427 |
| NL | 49974 | * 3/1941 | | 411/427 |

* cited by examiner

*Primary Examiner*—Flemming Saether
(74) *Attorney, Agent, or Firm*—Roberts, Abokhair and Mardula, LLC (57) ABSTRACT

An insert according to the present invention has a very low transverse Coefficient of Thermal Expansion. This is the result of an isolation and compensation structure formed by a sleeve surrounding a post. The sleeve isolates the post from the thermal expansion effects of the panel. This eliminates the influence of thermal expansion/contraction of both the panel and the bonding material. Since the post itself will also expand and contract with temperature, the attachment point of the post to the sleeve is deliberately selected so as to compensate for the post's own dimensional changes.

20 Claims, 8 Drawing Sheets

ANTI-DISTORTION INSERT FOR MOUNTING OPTICAL ELEMENTS ON A HONEYCOMB PANEL

BACKGROUND OF THE INVENTION

1. Field of the Invention

The present invention is directed to an anti-distortion insert to provide threaded attachment to a panel. More specifically, the present invention is directed to an anti-distortion insert for threaded fastening of optical elements to a honeycomb panel.

2. Background Information

Elements of an optical system are often mounted together on a common flat panel. Threaded inserts are embedded in the panel at predetermined positions so that the optical elements may be bolted to the common flat panel in a straightforward manner.

Figure 1:
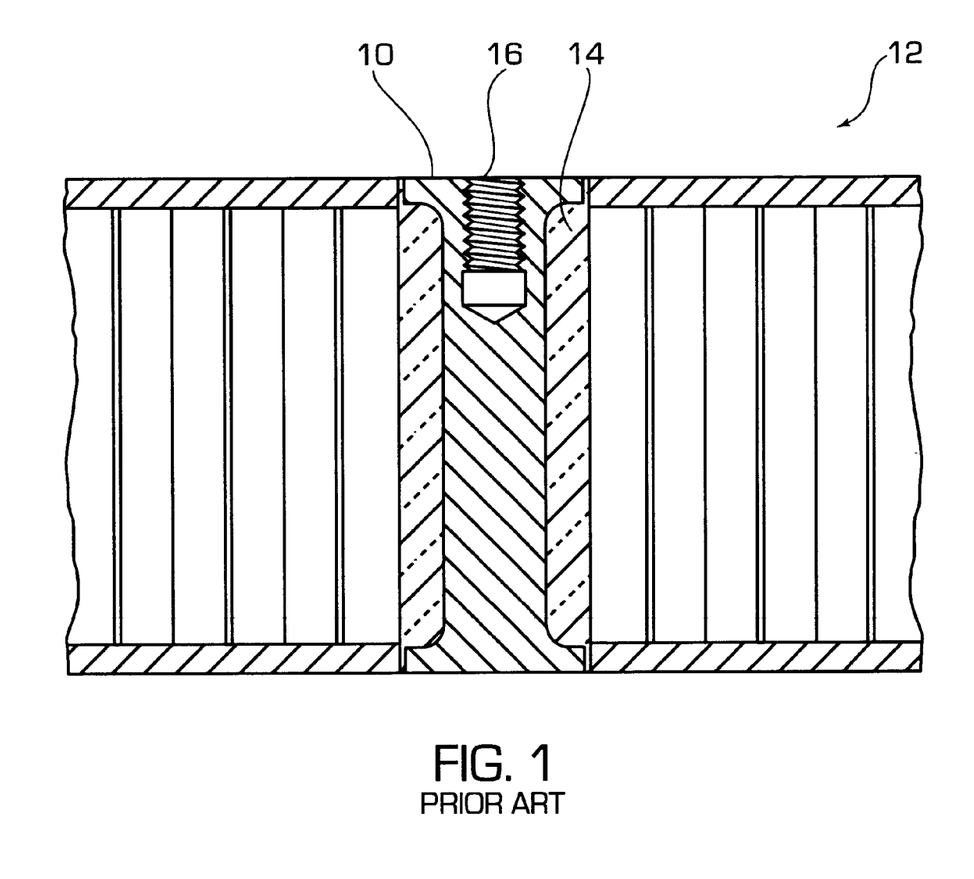
FIG. 1 illustrates, in cross-section, an insert according to the prior art embedded all the way through a honeycomb panel.

Referring to FIG. 1, a cross-sectional view is shown of a threaded insert 10 that is bonded to a honeycomb panel 12 by epoxy resin 14. The insert 10 is embedded all the way through the panel 12. The threaded bore 16 of the insert 10 is useful for fastening elements of an optical system to the panel 12.

Figure 2:
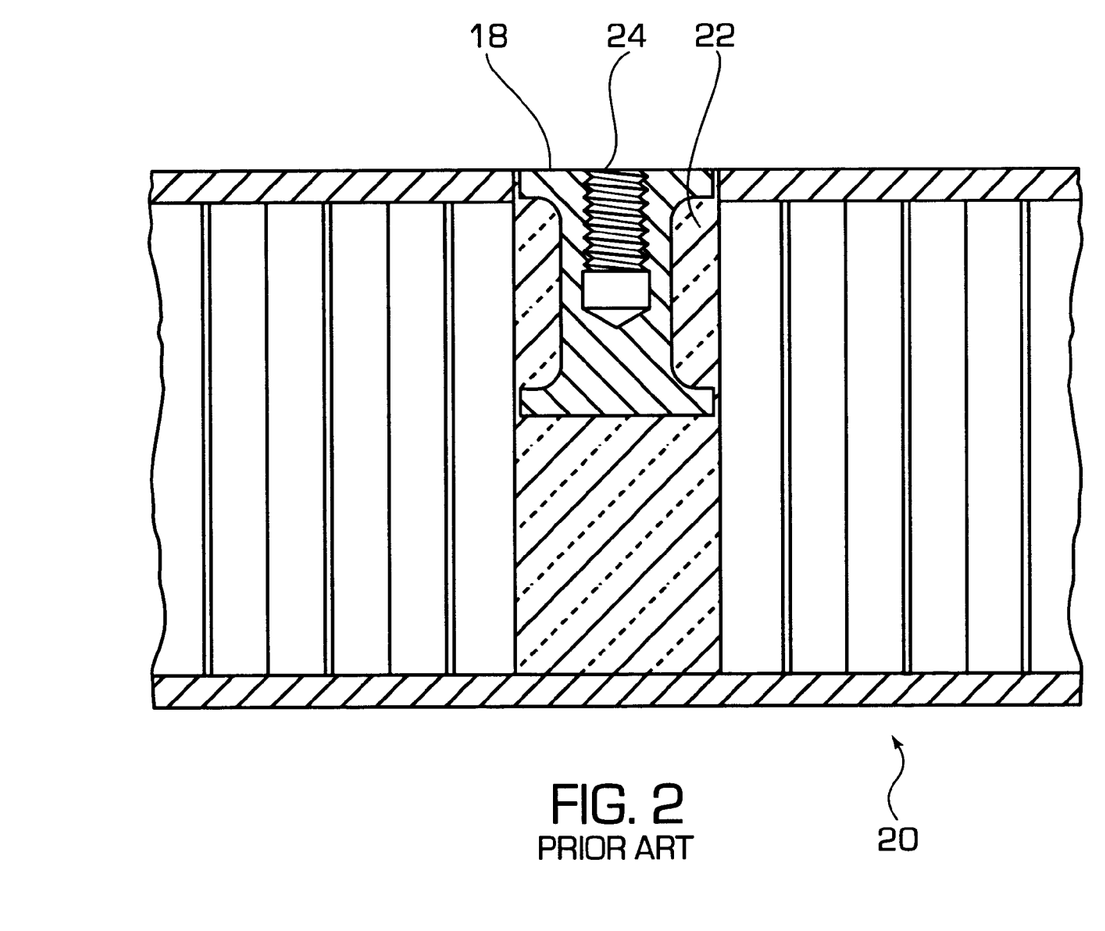
FIG. 2 illustrates, in cross-section, an insert according to the prior art embedded partially through a honeycomb panel.

Referring to FIG. 2, a cross-sectional view is shown of a threaded insert 18 that is embedded only partially through a honeycomb panel 20. The insert 18 is bonded to the panel 20 by epoxy resin 22. The threaded bore 24 of the insert 18 is useful for fastening elements of an optical system to the panel 20.

Honeycomb panels (i.e., having a honeycomb core structure) have been developed that have very low thermal distortion properties in the lateral plane (i.e., the plane of the flat panel). As a result, the elements of the optical system that are affixed to a honeycomb panel maintain a consistent position and orientation in the lateral plane, despite temperature gradients that may develop across the honeycomb panel. However, thermal expansion and contraction in the transverse direction (i.e., perpendicular to the plane of the flat panel) remains a problem for honeycomb panels.

The amount of expansion or contraction of the panel per unit of temperature in the transverse direction is called the transverse (or "through-the-thickness") Coefficient of Thermal Expansion. The transverse Coefficient of Thermal Expansion ($CTE_{TRANS}$) of a honeycomb panel in the vicinity of a conventional bonded insert is primarily a function of the material forming the core of the panel, the material forming the insert, and the type and amount of the adhesive used to bond the insert to the panel. This may be expressed generally as $$CTE_{TRANS} \sim K_1 \cdot CTE_{PANEL} + K_2 \cdot CTE_{INSERT} + K_3 \cdot CTE_{BOND} \quad (1)$$

where $CTE_{PANEL}$ is the coefficient of thermal expansion of the panel core material in the transverse direction, $CTE_{INSERT}$ is the coefficient of thermal expansion of the insert material, $CTE_{BOND}$ is the coefficient of thermal expansion of the material bonding the insert to the panel, and $K_1$, $K_2$, and $K_3$ are each constants.

For a conventional insert, the $CTE_{TRANS}$ at the insert can be substantial, causing the optical component mounted to the panel at that location to undergo an unacceptably high transverse deflection as a result of a temperature change.

To attempt to minimize $CTE_{TRANS}$, it has been proposed to make the inserts of a material that has a low CTE and to increase the mass of the inserts. Although this would tend to lower the overall $CTE_{TRANS}$, it is not an acceptable alternative for applications where minimizing weight is critical. The panel generally has dozens of inserts. Making substantial increases in the mass of each of the inserts would add up to a large mass increase in the aggregate. Such a large mass increase would be problematic, for example, in a spacecraft where mass must be minimized for launch.

It has also been proposed to manufacture the honeycomb panel using a graphite core with improved dimensional stability. However, this is not a satisfactory solution either, because (assuming a sufficiently stable graphite core could be discovered) the thermal dimension changes caused by the bonding material would still contribute to a $CTE_{TRANS}$ of substantial size.

Thus, what is needed is an insert, for use with honeycomb panels, which will isolate an optical component mounted thereon from thermal expansion and contraction of the honeycomb panel and any bonding material used to bond the insert to the panel.

Furthermore, even if an optical component could be perfectly isolated from the thermally induced dimension changes of the honeycomb panel and the bond material, this does not solve the entire problem. That is because the insert itself also expands and contracts as a function of temperature. Accordingly, the insert also contributes to $CTE_{TRANS}$.

Thus, what is also needed is an insert that will compensate for its own thermal expansion and contraction, so as to minimize thermally-caused deflection of an optical component mounted thereon.

SUMMARY OF THE INVENTION

It is an object of the present invention to provide an interface point to a honeycomb panel that has a very low $CTE_{TRANS}$ irrespective of the CTE of the honeycomb panel in the transverse (through-the-thickness) direction.

It is also an object of the present invention to provide a honeycomb panel threaded insert that isolates an optical component mounted thereon from thermal expansion and contraction of the honeycomb panel and any bonding material used to bond the insert to the panel.

It is an additional object of the present invention to provide a threaded insert that compensates for its own thermal expansion and contraction, so as to minimize thermally-caused deflection of a component mounted thereon.

It is a further object of the present invention to provide a mounting panel for mounting components, wherein the attachment points for mounting have a very low $CTE_{TRANS}$ irrespective of the CTE of the mounting panel in the transverse (through-the-thickness) direction.

Some of the above objects are achieved by a fastener for providing isolation from thermal expansion and contraction. The fastener has a sleeve and a post. The sleeve has a positioning pad projecting from its interior surface. The post is attached to the inside of the sleeve and is axially positioned inside the sleeve by the positioning pad. The post is substantially isolated by the sleeve from thermal expansion and contraction external to the fastener.

Other of the above objects are accomplished by an insert for use with a honeycomb panel. The insert has a sleeve and a post. The sleeve has a positioning pad projecting from its interior surface. The post is attached to the inside of the sleeve and is axially positioned inside the sleeve by the positioning pad.

Another of the above objects is accomplished by mounting panel for mounting optical elements via threaded engagement. The mounting panel has a honeycomb panel with plural threaded inserts imbedded in the honeycomb panel at predetermined locations. The inserts each have a sleeve and a post. The sleeves each have a positioning pad projecting from their interior surfaces. The posts are attached to the inside of their respective sleeves and are axially positioned inside the sleeve by the positioning pad.

Some of the above objects of the present invention are also achieved by a one piece unitary insert for use with a honeycomb panel. The insert has a sleeve portion and a post portion. The post portion is surrounded by the sleeve portion and cantilevered with respect to the sleeve portion from a meeting point axially positioned inside the sleeve portion.

According to one embodiment of the present invention, the insert has two parts, a sleeve and a post that attaches to the inside of the sleeve. The exterior surface of the sleeve is bonded to the panel and has a positioning pad on its interior surface. The post has a threaded engagement with the sleeve, and is axially positioned inside the sleeve by the positioning pad.

According to another embodiment of the present invention, the insert is formed of a single piece having a sleeve portion and a post portion inside the sleeve portion. The exterior of the insert is bonded to the panel. The point at which the post portion and the sleeve portion meet is the meeting point. The meeting point location is selected so as to isolate the post portion from thermal expansion effects of the panel and bonding material, and to compensate for the thermal changes in the post portion itself.

BRIEF DESCRIPTION OF THE DRAWINGS

Additional objects and advantages of the present invention will be apparent in the following detailed description read in conjunction with the accompanying drawing figures.

DETAILED DESCRIPTION OF THE INVENTION

The present invention is useful in a variety of situations where dimensional stability is desired despite substantial swings in temperature. Certainly the present invention has use in optical systems that are subject to thermal variations. It is also usefull in spacecraft, particularly for mounting sensors and optical elements.

An insert according to an embodiment of the present invention provides an attachment point preferably having a small transverse Coefficient of Thermal Expansion. This is the result of an isolation and compensation structure formed by a sleeve surrounding a post. The sleeve isolates the post from the thermal expansion effects of the panel. This eliminates the influence of thermal expansion/contraction of both the panel and the bonding material that fixes the sleeve to the panel.

Since the post itself will also expand and contract with temperature, the point at which the post meets the sleeve is deliberately positioned so as to compensate for the post's own dimensional changes. The transverse displacement of the tip of the post is the algebraic sum of the displacement of the meeting point and the deformation of the post itself under a given temperature excursion. Knowing the CTE of the post, calculating or empirically measuring how much the meeting point displaces due to unit temperature change, the panel thickness, and the length of the post, the location of the meeting point is tailored to achieve a desired $CTE_{TRANS}$. $CTE_{TRANS}$ can be made as low as zero, within fabrication tolerances.

The resulting advantage is that despite thermal swings, the point at which optical elements or other things attach to the insert does not move laterally with respect to the center of the panel. Since all the inserts have this property in common, all the optical elements mounted on those inserts have the common property of not moving with respect to the center of the panel. This provides a dimensional stability with temperature variation not available in the prior art.

It is preferred that both the sleeve and the post of an insert according to the present invention be formed out of a low CTE metal such as INVAR. It is noted that, in principle, higher CTE materials can also be used owing to the inherent cancellation structure of the present invention. For example, it is contemplated that materials including titanium, steel, and beryllium copper are suitable for embodying the present invention.

Figures 3, 4:
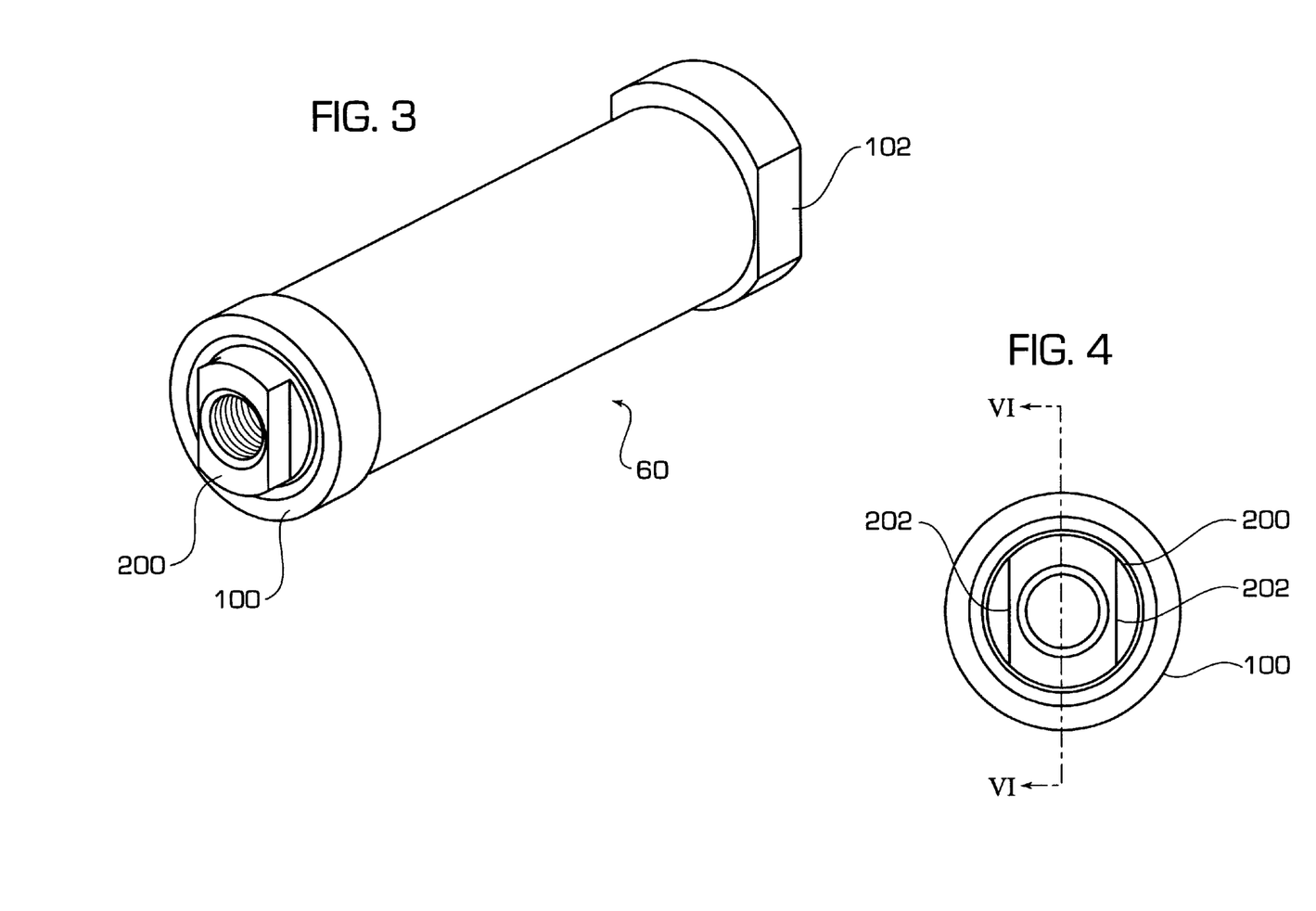
FIG. 3 illustrates a perspective view of an insert according to an embodiment of the present invention.
FIG. 4 illustrates an elevation view of the insert of FIG. 3.

Referring to FIG. 3, a perspective view of an insert 60 according to an embodiment of the present invention is illustrated. The sleeve 100 surrounds the post 200, which is connected to the sleeve 100 via a threaded engagement. Flattened sleeve surfaces 102 (only one is shown) are formed at the periphery of the sleeve 100 to facilitate threaded engagement of the sleeve 100 with the post 200.

Referring to FIG. 4, an elevation view of the insert 60 of FIG. 3 is illustrated. This "end on" view of the insert shows flattened post surfaces 202 formed at the end of the post 200 to facilitate threaded engagement of the sleeve 100 with the post 200.

Figure 5:
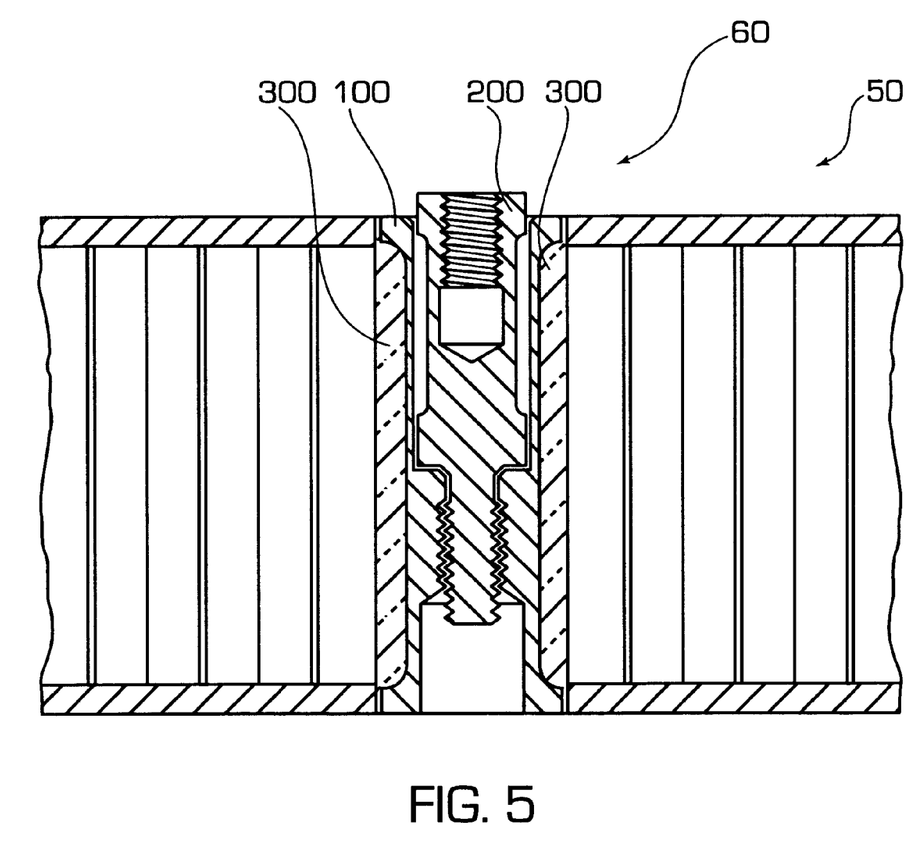
FIG. 5 illustrates, in cross-section, the insert of FIGS. 3 and 4 embedded through a honeycomb panel.

Referring to FIG. 5, the insert 60 of FIGS. 3 and 4 is shown, in cross-section, embedded through a honeycomb panel 50. The insert 60 is bonded into place by a bonding material 300 disposed between the panel 50 and the sleeve 100. It is preferred that a bonding material (e.g., adhesive epoxy) having the lowest possible CTE be employed to bond inserts according to the present invention to a panel. However, such careful choice of bonding material is not required in order to practice the present invention.

Figure 6:
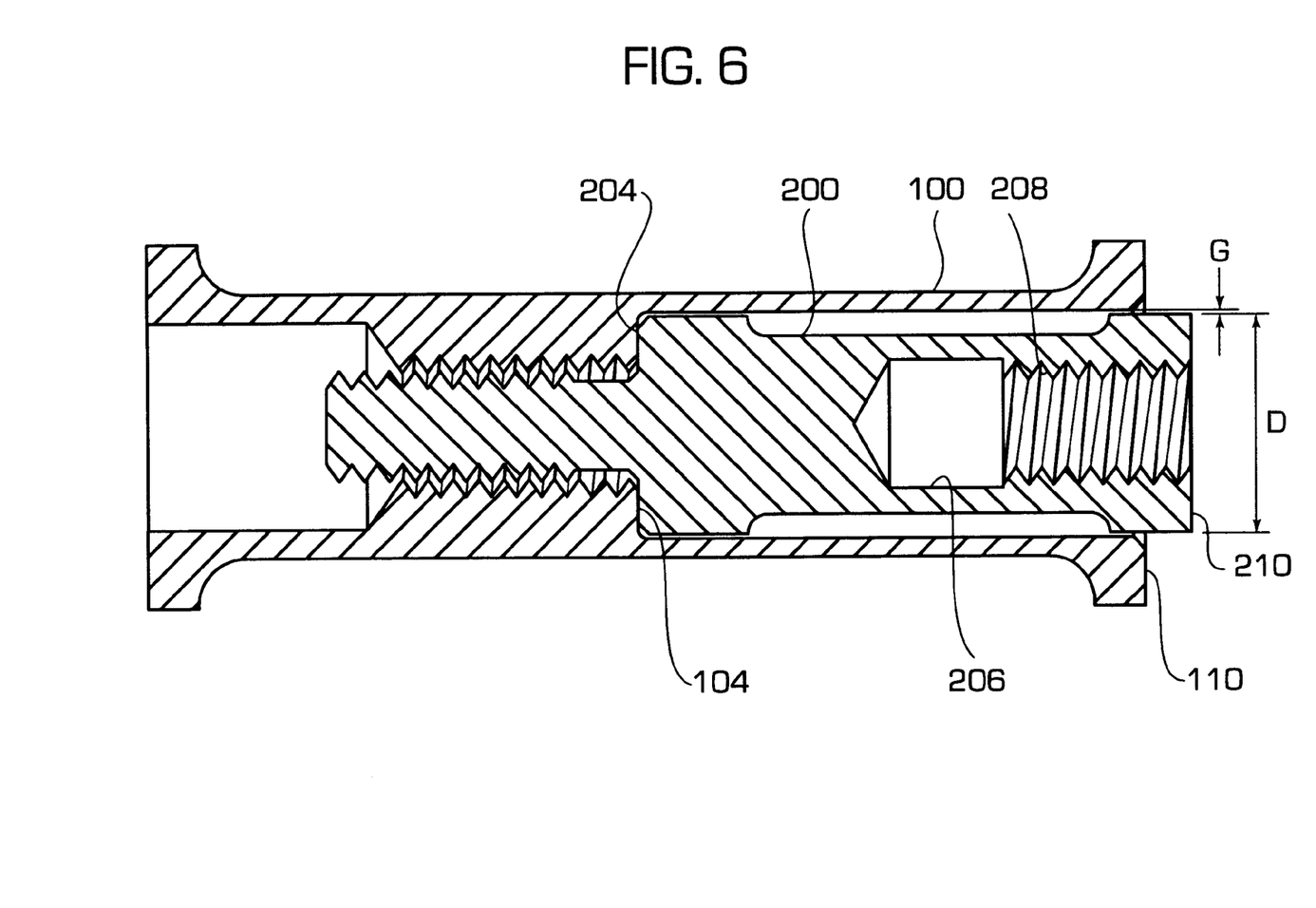
FIG. 6 illustrates a cross-sectional view of an insert according to an embodiment of the present invention, taken at the section line in FIG. 4.

Referring to FIG. 6, a cross-sectional view (taken at the section line in FIG. 4) of an insert according to an embodiment of the present invention is illustrated. This view well illustrates the meeting point at which the stop face 204 of the post 200 abuts the positioning pad 104 of the sleeve 100. The positioning pad 104 is an annular flat surface machined on the sleeve 100, normal to the longitudinal axis of the sleeve 100. The positioning pad 104 is positioned axially with respect to the top of the sleeve 100 as explained in detail below. The stop face 204 is an annular flat surface machined on the post 200, normal to the longitudinal axis of the post 200. Since the stop face 204 and the positioning pad 104 are intended to abut one another, they are similarly sized but need not coincide precisely in their dimensions.

The diameter D of the post 200 is maximized, so as to provide maximum structural strength to handle stress. Strength of the post 200 is a relevant consideration because it is cantilevered from the meeting point where the stop face 204 and the positioning pad 104 abut, thus subjecting the post to stress due to bending forces. Additionally, the overall size of the insert 60 is chosen so as to handle intended loads.

Maximizing the diameter D is limited in view of the need to avoid contact between the post 200 and sleeve 100 near their ends 110, 210, even when bending forces are applied to the post. Thus, D is chosen so as to ensure that a small gap G is maintained, regardless of dimensional variations of the parts.

Also shown are the threads 208 in the bore 206 in the post 200, provided for attachment of an optical element to a panel via the insert.

Figure 7:
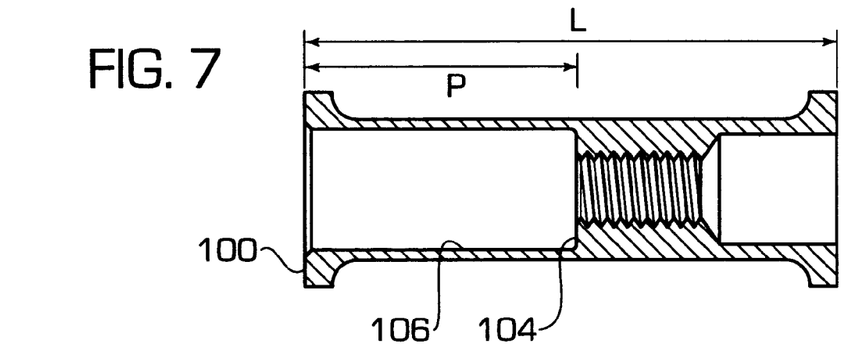
FIG. 7 illustrates, in cross section, the sleeve portion only of the insert shown in FIG. 6.

Referring to FIG. 7, the sleeve portion 100 only of the insert 60 of FIG. 6 is shown in cross-section. The bore 106 formed in the sleeve 100 has a depth P, measured to the positioning pad 104. The overall length of the sleeve is indicated by dimension L. The depth P is offset slightly from the midpoint valued of L/2 in order to compensate for thermal variations in the length of the post 200. Thus, P is selected so that $$P = L/2 + \Delta \quad (2)$$

The value of the offset A may be determined based on the formula:

$$\Delta = L_p \cdot (CTE_{POST}/CTE_{MEAS}) \quad (3)$$

where $L_p$ is the length of the post above its stop face 204, $CTE_{POST}$ is the CTE of the material the post 200 is formed of, and $CTE_{MEAS}$ is a measured CTE indicative of thermal change of the connection point for the combination of the sleeve 100 imbedded in a panel with bonding material. A less elegant, alternative way to determine an appropriate A value is simple trial and error.

Figure 8:
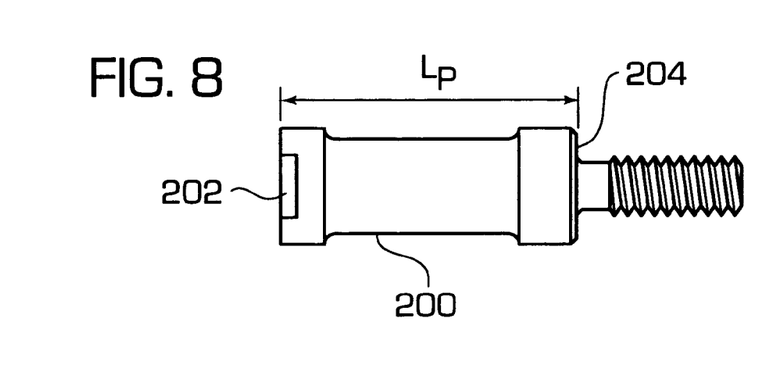
FIG. 8 illustrates an elevation view of the post portion only of the insert shown in FIG. 6.

Referring to FIG. 8, an elevation view of the post portion only of the insert of FIG. 6 is shown. The length $L_p$ of the post 200 above its stop face 204 is indicated.

The post 200 is threaded into the sleeve 100 and contacts the sleeve at their common threads and at the meeting point where the stop face 204 abuts the positioning pad 104. There is no contact between the post 200 and the sleeve 100 beyond that point. The radial clearance between the post and the sleeve is sufficiently large at the gap G so that there is no impediment to free thermal expansion and contraction of the post.

Figure 9:
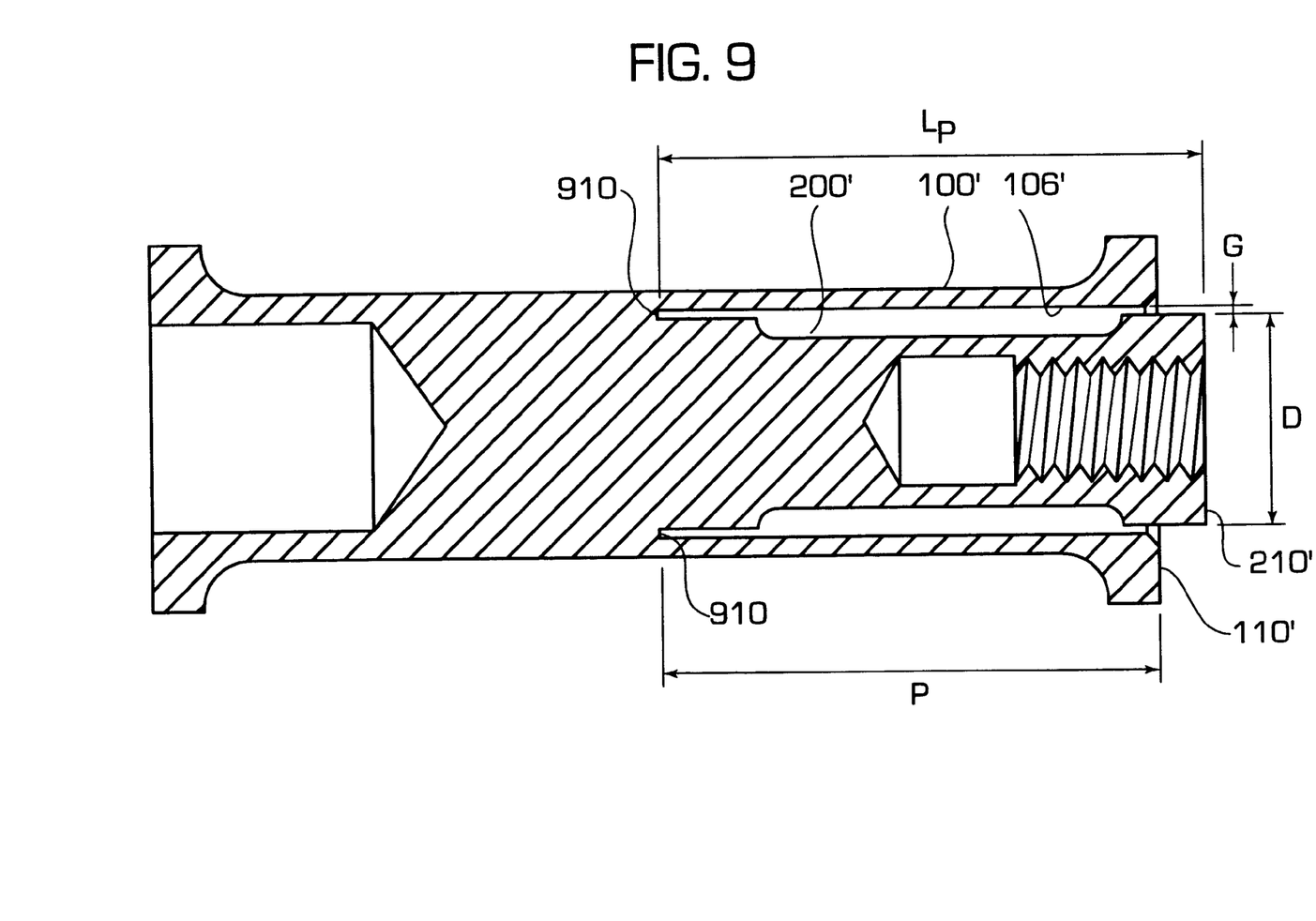
FIG. 9 illustrates a cross-sectional view of an insert according to an alternate embodiment of the present invention.

The embodiment described above has two separate pieces, the post and the sleeve, that are formed separately and then connected to one another via threaded engagement. According to an alternate embodiment, the insert is embodied as a single, unitarily formed piece. In this alternate embodiment, the sleeve and post are formed together as a single piece. This is illustrated in FIG. 9. A common feature between these embodiments is that there remains a cantilevered length $L_p$ measured from the melting point 910 to the post 210' of the post that is radially isolated from the sleeve 100 above the meeting point 910 of the sleeve 100 and the post 200. Another common feature between these embodiments is that the depth P measured from the melting point 910 to the sleeve end 110' of the bore 106' in the sleeve is determined according to the above-described principles for offset.

Figure 10:
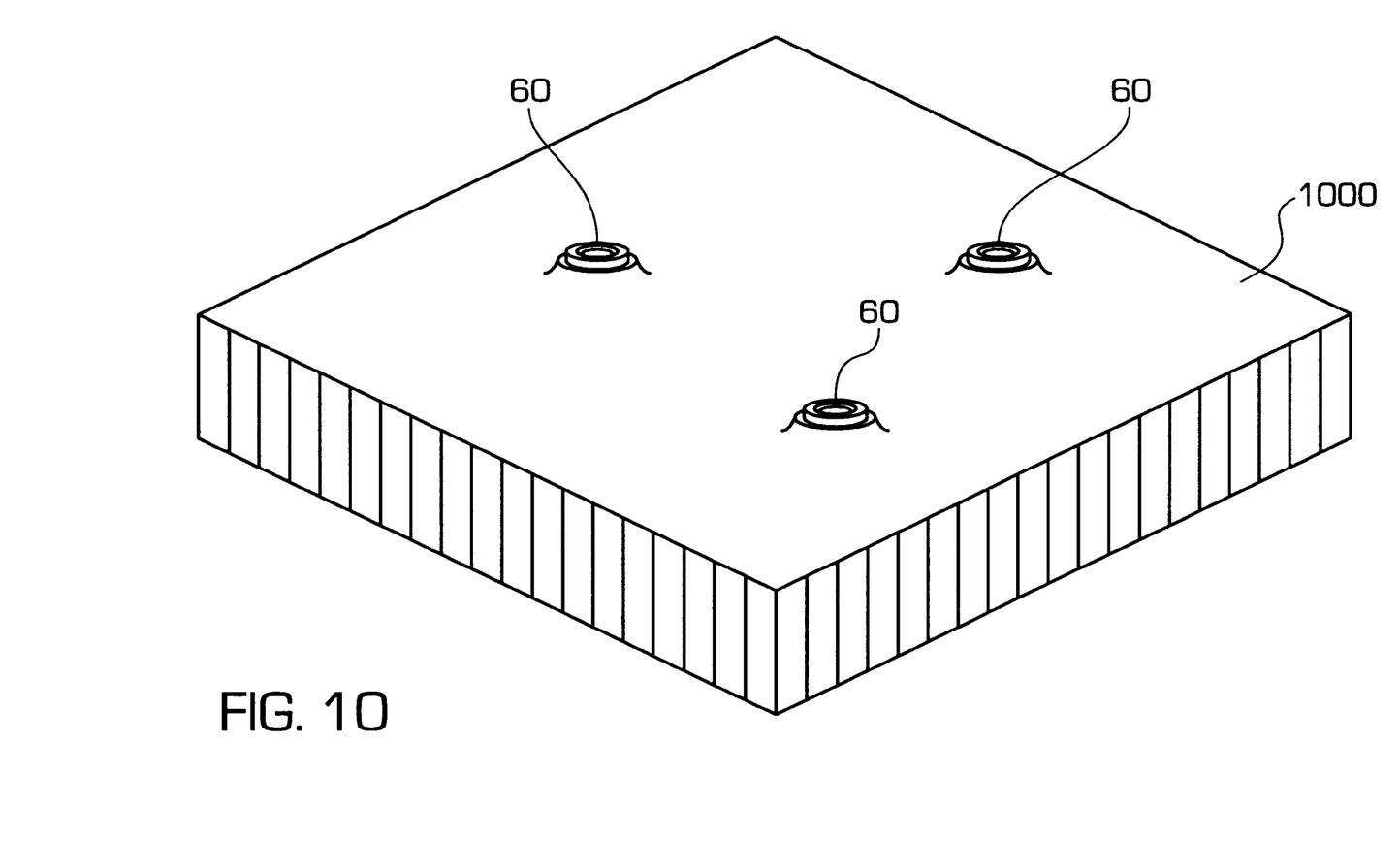
FIG. 10 illustrates an embodiment of the present invention wherein anti-distortion inserts are embedded in a honeycomb panel.

The embodiments described above provide for the insert 60 to be imbedded in a panel 100 via a bonding material. This is illustrated in FIG. 10. Alternately, the insert is formed with additional threads on the outside of the sleeve. In this way the insert is fixable to a panel or other substrate via a threaded engagement, rather than chemical bonding.

The present invention has been described in terms of preferred embodiments, however, it will be appreciated that various modifications and improvements may be made to the described embodiments without departing from the scope of the invention as described.

What is claimed is:

1. A fastener for providing isolation from thermal expansion and contraction, the fastener comprising:
   a sleeve;
   a post; and
   means for attaching the post inside of the sleeve so as to substantially isolate an end of the post from thermal expansion and contraction external to the fastener.

2. The fastener recited in claim 1, wherein the post is tapped with threads for fastening.

3. An insert for use with a honeycomb panel, the insert comprising:
   a sleeve;
   a post;
   means for attaching the post inside of the sleeve via threaded engagement so as to substantially isolate an end of the post from transverse thermal expansion and contraction external to the insert.

4. The insert recited in claim 3, wherein the post is positioned inside the sleeve so as to substantially compensate for thermal expansion and contraction of the post.

5. The insert recited in claim 3, wherein the post is tapped with threads for fastening.

6. An insert for use with a honeycomb panel, the insert comprising:
   a sleeve, having a positioning pad projecting from its interior surface; and
   a post attached to the inside of the sleeve and being axially positioned inside the sleeve by the positioning pad, wherein the post is connected to the sleeve via threaded engagement, and wherein the post has an upper end and the sleeve has an upper end, the upper end of the post being adjacent to and surrounded by the upper end of the sleeve and being spaced from the upper end of the sleeve by at least/a minimum gap G.

7. The insert recited in claim 6, wherein the positioning pad is located a distance P from the upper end of the sleeve, the distance P being according to the formula $$P = L/2 + \Delta$$

where L is the axial length of the sleeve and $\Delta$ is a predetermined offset.

8. An insert for use with a honeycomb panel, the insert comprising:
   a sleeve, having a positioning pad projecting from its interior surface; and a post attached to the inside of the sleeve and being axially positioned inside the sleeve by the positioning pad;

wherein the post has an upper end and the sleeve has an upper end, the upper end of the post being adjacent to and surrounded by the upper end of the sleeve and being spaced from the upper end of the sleeve by at least a minimum gap G;

wherein the positioning pad is located a distance P from the upper end of the sleeve, the distance P being determined according to the formula $$P = L/2 + \Delta$$

where L is the axial length of the sleeve and $\Delta$ is a predetermined offset; and wherein the offset $\Delta$ is determined according to the formula $$\Delta = L_p \cdot (CTE_{POST}/CTE_{MEAS})$$

where $L_p$ is the distance from the upper end of the post to the stop face, $CTE_{POST}$ is the coefficient of thermal expansion of the post, and $CTE_{MEAS}$ is a measured coefficient of thermal expansion indicative of thermal change of the positioning pad when the sleeve is imbedded in the honeycomb panel with a bonding material.

9. A mounting panel for mounting optical elements via threaded engagement, the panel comprising:

a honeycomb panel; and plural threaded inserts imbedded in the honeycomb panel at predetermined locations, the inserts comprising:

a sleeve;

a post; and means for attaching the post inside of the sleeve via threaded engagement so as to substantially isolate an end of the post of each threaded insert from transverse thermal expansion and contraction of the honeycomb panel.

10. The mounting panel recited in claim 9, wherein the post of each threaded insert is positioned inside the respective sleeve so as to substantially compensate for thermal expansion and contraction of the post.

11. The mounting panel recited in claim 9, wherein the post of each threaded insert is tapped with threads for fastening.

12. A one piece unitary insert for use with a honeycomb panel, the insert comprising:

a sleeve portion;

a post portion surrounded by the sleeve portion; and means for cantilevering the post with respect to the sleeve so as to substantially compensate, at an end of the post portion, for thermal expansion and contraction of the post portion.

13. The insert recited in claim 12, wherein the post portion is substantially isolated from transverse thermal expansion and contraction external to the insert.

14. The insert recited in claim 12, wherein the post portion is tapped with threads for fastening.

15. A fastener for providing isolation from thermal expansion and contraction, the fastener comprising:

a sleeve;

a post; and means for attaching the post to the inside of the sleeve so as to substantially isolate an end of the post from thermal expansion and contraction external to the fastener and substantially compensate for thermal expansion and contraction of the post;

wherein the post is tapped with threads for fastening.

16. An insert for use with a honeycomb panel, the insert comprising:

a sleeve, having a positioning pad projecting from its interior surface; and a post attached to the inside of the sleeve and being axially positioned inside the sleeve by the positioning pad;

wherein the post has an upper end, the sleeve has an upper end, and the positioning pad is located a distance P from the upper end of the sleeve, the distance P being determined according to the formula $$P = L/2 + \Delta$$

where L is the axial length of the sleeve and $\Delta$ is a predetermined offset; and wherein the offset $\Delta$ is determined according to the formula, $$\Delta = L_p \cdot (CTE_{POST}/CTE_{MEAS})$$

where $L_p$ is the distance from the upper end of the post to the stop face, $CTE_{POST}$ is the coefficient of thermal expansion of the post, and $CTE_{MEAS}$ is a measured coefficient of thermal expansion indicative of thermal change of the positioning pad when the sleeve is imbedded in the honeycomb panel with a bonding material.

17. A method of isolating part of a fastener from thermal expansion and contraction, the method comprising:

providing a fastener sleeve that has a positioning pad projecting from its interior surface;

providing a fastener post; and attaching the post to the inside of the sleeve at an axial position inside the sleeve determined by the positioning pad, wherein an end of the post would be substantially isolated by the sleeve from thermal expansion and contraction external to the fastener.

18. The method of isolating of claim 17, further comprising: tapping the post with threads for fastening.

19. A method of compensating for thermal expansion and contraction in a one piece unitary insert, the method comprising:

providing an insert sleeve;

providing an insert post; and forming the post together with the sleeve so as to form a unitary insert with the post being surrounded by the sleeve and being cantilevered with respect to the sleeve from a meeting point axially positioned inside the sleeve portion, wherein the meeting point is axially positioned so as to substantially compensate, at an end of the post, for thermal expansion and contraction of the post.

20. The method of compensating of claim 19, further comprising: tapping the post with threads for fastening.

* * * * *

UNITED STATES PATENT AND TRADEMARK OFFICE
CERTIFICATE OF CORRECTION

PATENT NO. : 6,394,722 B1
APPLICATION NO. : 09/427390
DATED : May 28, 2002
INVENTOR(S) : Cengiz Kunt and Chiachung Lee It is certified that error appears in the above-identified patent and that said Letters Patent is hereby corrected as shown below:

On the title page:

In ITEM (56) References Cited insert the following references from PTO-1449 considered and approved on 7/23/2001, originally submitted for consideration on 5/29/2001

US Patents
3,137,887 A.J. Mannino et al. 06/1964     16/2
3,252,493 J.D. Smith     05/1966   151/41.7
4,834,569 Foote et al.     05/1989     403/2
4,490,083 Rebish     12/1984   411/338

Foreign Patents
JP     08-159115     06/1996
GB     2319589 A1     05/1998

| | | |
|---|---|---|
| COLUMN 4, | LINE 1, | change "usefull" to --useful-- |
| COLUMN 5, | LINE 38, | change "offset A" to "offset $\Delta$" |
| COLUMN 5, | LINE 47, | change "appropriate A" to "offset $\Delta$" |
| COLUMN 6, | LINE 1, | insert a parenthesis before "measured" |
| COLUMN 6, | LINE 2, | change "post 210' of" to --post end 210') of-- |
| COLUMN 6, | LINE 3, | change both occurrences of "100" to --100'-- |
| COLUMN 6, | LINE 4, | change "200" to --200'-- |
| COLUMN 6, | LINE 5, | insert a parenthesis before "measured" and change "melting" to --meeting-- |
| COLUMN 6, | LINE 6, | insert a parenthesis after "110'" |
| COLUMN 6, | LINE 10, | change "panel 100" to --panel 1000-- |

UNITED STATES PATENT AND TRADEMARK OFFICE
CERTIFICATE OF CORRECTION

PATENT NO. : 6,394,722 B1
APPLICATION NO. : 09/427390
DATED : May 28, 2002
INVENTOR(S) : Cengiz Kunt and Chiachung Lee It is certified that error appears in the above-identified patent and that said Letters Patent is hereby corrected as shown below:

In the claims:
CLAIM 6, COLUMN 6, LINE 56, change "least/a" to --least a--

Signed and Sealed this

Twentieth Day of January, 2009

JON W. DUDAS
*Director of the United States Patent and Trademark Office*